(No Model.)
J. S. NAFFZIGER.
HAY RAKE AND LOADER.
No. 337,697. Patented Mar. 9, 1886.
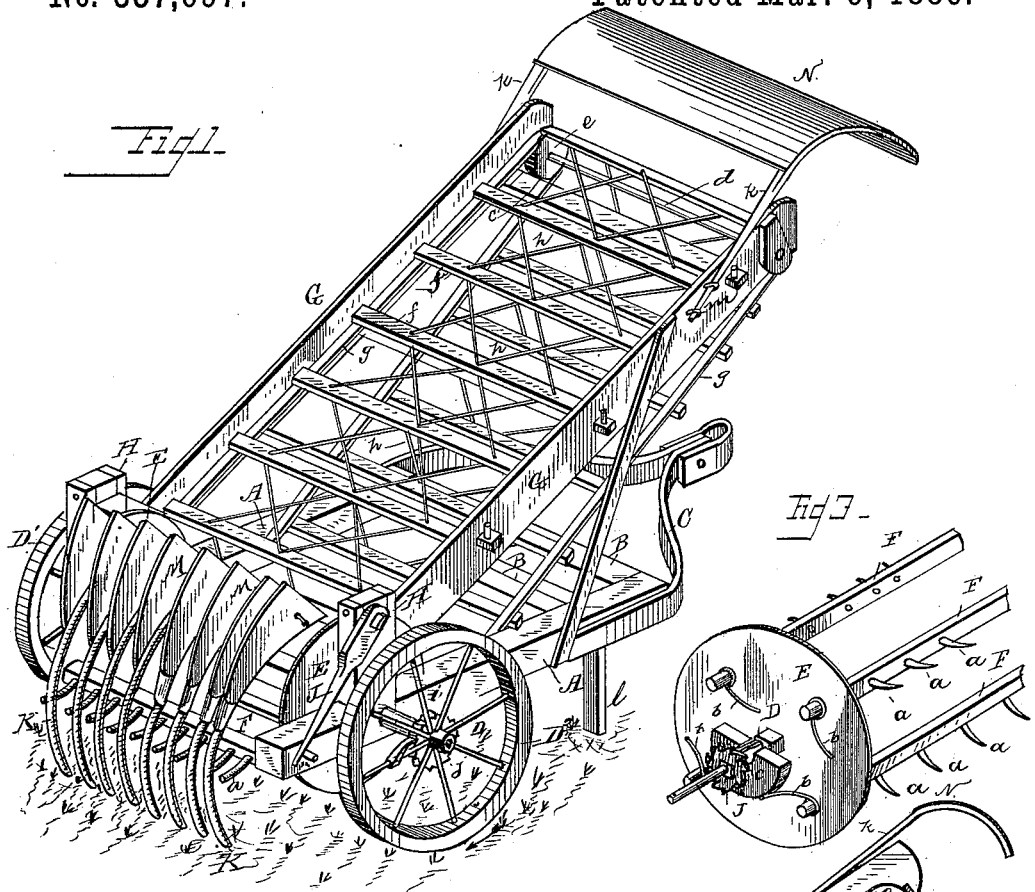
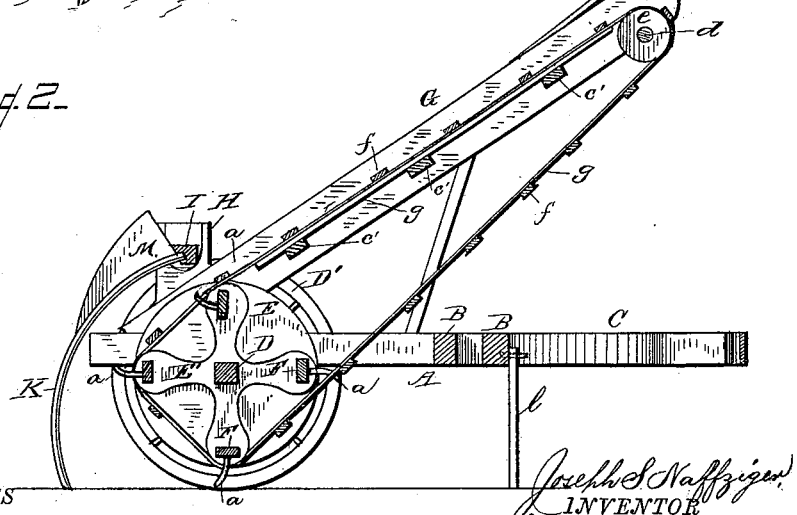
WITNESSES
F. L. Durand
E. M. Johnson
Joseph S. Naffziger
INVENTOR
Attorney

UNITED STATES PATENT OFFICE.

JOSEPH S. NAFFZIGER, OF WHEATLAND, MISSOURI.

HAY RAKE AND LOADER.

SPECIFICATION forming part of Letters Patent No. 337,697, dated March 9, 1886.

Application filed June 12, 1884. Serial No. 134,672. (No model.)

*To all whom it may concern:*

Be it known that I, JOSEPH S. NAFFZIGER, a citizen of the United States of America, residing at Wheatland, in the county of Hickory and State of Missouri, have invented certain new and useful Improvements in Hay Rakes and Loaders; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to combined hay rakes and loaders; and it consists in the improvements and combination of parts hereinafter described and set forth, whereby the hay is primarily raked and separated and then passed onto the loading-belt actuated by a feeding-drum provided with teeth to assist in the loading operation, which teeth are automatically maintained in proper relative position.

In the accompanying drawings, forming part of this specification, Figure 1 is a rear perspective view of the combined rake and loader embodying my improvement. Fig. 2 is a central longitudinal section, and Fig. 3 is a detail perspective view.

The draft-frame consists of side bars, A, parallel front bars, B B, and draft yoke or tongue C. The shaft D turns in bearings secured at the under side of the rear portions of the bars A, and upon the projecting ends of said shaft are mounted the carrying-wheels D' D''. Two disks, E, are rigidly keyed on the shaft D adjacent to the inner faces of the side bars, A, and near the said disks are keyed cross-arms E', which form the side portions of the reel. The outer ends of said cross-arms E' are rounded, as indicated in Fig. 2. A series of bars, F, extend transversely from disk to disk and are reduced at their ends, to bear in perforations formed therefor in the arms E' and in the disks E. Each bar F is provided with a series of parallel teeth, $a$, curved as shown. The projecting end of each cross-bar is provided with a spring, $b$, which, as the drum is revolved, is designed to come in contact with a block, $c$, secured on the inner side of one of the bars A and located adjacent to one of the journals, thereby successively moving the bars F, as they pass to an upper position on the wheel, so that their teeth $a$ will pass from a position radial to the axis to a position oblique thereto, so as to carry the hay or straw gathered by the rake-teeth upon an endless rotary belt. These teeth are placed automatically in a radial position with respect to the center of the disk when the spring-arms thereof come in contact with a cam, C, and as soon as they pass above the center of the disk they fall by gravity to an oblique position, thus allowing the belt to pass over the said teeth. Two side bars, G, are secured at their rear ends to the rear portions of the bars A, so that said bars G will extend forwardly and upwardly in an oblique position. These bars are secured and braced together by means of cross or tie rods $c'$. A shaft, $d$, journaled in bearings at the upper front portions of the bars G, has pulleys $e$ keyed thereon at the inner sides of said bars. A series of transverse bars, $f$, are secured at their ends to two parallel belts, $g$, which are arranged at the inner side of each bar G and pass over one of the pulleys $e$ and around the ends of the arms E'. The bars $f$ are held rigidly with respect to each other, as indicated in Fig. 1, by a series of cables or cords, $h$, which diagonally cross each other and are laced through perforations in the said bars $f$, so that the said bars, cords $h$, and belts $g$ conjointly form a continuous or endless web. Two vertical standards, H, are mounted on the upper sides of the rear portions of the side bars, A, and contain the bearing-boxes for a transverse horizontal shaft, I, one of the projecting ends of which carries a hand-lever, J. The said shaft I has extending rearwardly therefrom a series of parallel rake-teeth, K, which are curved as shown. A series of curved plates or blades, M, are secured in a vertical position to said curved teeth K at the point of their connection with the shaft I.

The curved plates M, hereinbefore described, are rigidly attached to the rake-teeth and give greater rigidity to the same, or, in other words, do not allow a spring movement of said teeth at their upper portions. This is desirable, as in some instances the hay or straw may accumulate under these plates before being carried upward by the belt, and if the teeth were not rigid their lower ends would be elevated.

The carrying-wheel D" turns loosely on the ends of the stub-shaft D and is provided with a pawl, $i$, which is adapted to engage a ratchet-wheel, $j$, keyed on the shaft D, so that the parts only operate when the machine moves in a forward direction.

The operation of my invention is as follows: The machine being moved in a forward direction and the rake-teeth being in the position illustrated in the accompanying drawings, the hay is raked up so as to be engaged by the teeth $a$ of the revolving drum, and upon the further revolution of the drum the springs on the ends of the bars F come in contact with the block adjacent to the journal, and the teeth $a$ are thrown in an oblique position, so that the hay will become readily disengaged therefrom and be carried by the web up to the front of the bars G and dumped or thrown into a wagon or other receptacle. Two curved arms, $k$, have their ends secured by loops $m$ on the outside of the upper portion of the bars G, and the said arms $k$ are connected together by a sheet of canvas or cloth, N, which prevents the scattering or separation of the hay or straw as it passes from the web. Two feet, $l$, are pivotally secured at their upper portions to the front bar, B, of the machine, so that they may be turned down to support the same.

I claim—

1. The combination, in a combined rake and holder, of a supporting-frame carrying a reel or drum, a series of bars arranged in said reel and provided with teeth, a projection or spring arranged on the end of each of said bars to come in contact with a fixed portion of the machine, an endless carrier composed of the belts $g$, parallel bars $f$, and interlaced and crossed cords passing through said bars, as and for the purpose set forth.

2. The combination, in a combined rake and loader, of a drum mounted on a main axle, an endless carrier passing around said drum, a shaft journaled in standards of the frame and carrying a lever, a series of curved rake-teeth extending from said bar or shaft, and a series of blades or plates, M, rigidly connected to the upper portion of said teeth and curved to conform to said teeth for a portion of their length, substantially as specified.

3. In a combined rake and holder provided with a rake and carrying devices, as specified, a detachable fender, N, supported and operating substantially as set forth.

In testimony whereof I affix my signature in presence of two witnesses.

JOSEPH S. NAFFZIGER.

Witnesses:
EDWIN H. YEAR,
C. S. ESSEX.